United States Patent [19]
Saeki

[11] Patent Number: 6,115,532
[45] Date of Patent: *Sep. 5, 2000

[54] DIGITAL VCR WITH TRICK PLAY IMAGE CONTROL

[75] Inventor: Tomoki Saeki, Yokohama, Japan

[73] Assignee: Thomson Licensing S.A., Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/722,192

[22] PCT Filed: Apr. 3, 1995

[86] PCT No.: PCT/IB95/00229

§ 371 Date: Oct. 10, 1996

§ 102(e) Date: Oct. 10, 1996

[87] PCT Pub. No.: WO95/28801

PCT Pub. Date: Oct. 26, 1995

[30] Foreign Application Priority Data

| Apr. 13, 1994 | [GB] | United Kingdom | 9407283 |
| Apr. 13, 1994 | [GB] | United Kingdom | 9407287 |
| May 23, 1994 | [GB] | United Kingdom | 9410309 |

[51] Int. Cl.[7] .................................................. H04N 5/783
[52] U.S. Cl. ................................ 386/68; 386/81; 386/111
[58] Field of Search .............................. 386/6–8, 33, 68, 386/72, 81, 82, 109, 111, 112; H04N 5/76, 5/783, 5/92, 9/79

[56] References Cited

U.S. PATENT DOCUMENTS

| 4,731,659 | 3/1988 | Kani | 358/312 |
| 5,301,070 | 4/1994 | Tanaka | 360/10.1 |
| 5,377,050 | 12/1994 | Yun | 360/32 |
| 5,377,051 | 12/1994 | Lane et al. | 360/33.1 |
| 5,432,648 | 7/1995 | Watanabe et al. | 360/10.3 |
| 5,434,677 | 7/1995 | Oikawa | 358/335 |
| 5,687,275 | 11/1997 | Lane et al. | 386/68 |
| 5,727,113 | 3/1998 | Shimoda | 386/68 |

FOREIGN PATENT DOCUMENTS

| 562845 A2 | 9/1993 | European Pat. Off. | H04N 5/92 |

*Primary Examiner*—Thai Tran
*Attorney, Agent, or Firm*—Joseph S. Tripoli; Joseph J. Laks; Francis A. Davenport

[57] ABSTRACT

A digital video cassette recorder operates by the selection of predetermined replay speeds and the allocation of specific locations within each track from which data may be reproduced. These specific track locations are utilized during recording to place advance television image data for reproduction during trick play operation. The trick play image data is also reproduced during normal playback but may not be utilized. The specific track locations are selected to facilitate trick play operation at a plurality of speeds in both forward and reverse directions. Since the advanced television signal comprises a plurality of predicted frames, transition from trick play to normal speed replay requires a control function which is responsive to the reproduction, at normal replay speed, of an inter frame coded frame. Various methods of reproduced image transition are used for selecting both to and from trick play reproduction.

13 Claims, 19 Drawing Sheets

FIG. 6A

AUDIO SECTOR

| | | | | | |
|---|---|---|---|---|---|
| 2 TIMES P.B. (0-13 SYNC. BLOCKS) | | | | | |
| 4 TIMES P.B. (0-13 SYNC. BLOCKS) | | | | | |
| 8 TIMES P.B. (0-11 SYNC. BLOCKS) | | | | | |
| 16 TIMES P.B. (0-1 SYNC. BLOCKS) (9-13 SYNC. BLOCKS) | | | | | |

FIG. 6B

VIDEO SECTOR

| | | | | | | | | | |
|---|---|---|---|---|---|---|---|---|---|
| 2 TIMES P.B. (0-13 SYNC. BLOCKS) | | | | | | | | | |
| 4 TIMES P.B. (0-21 SYNC. BLOCKS) (53-141 SYNC. BLOCKS) | | | | | | | | | |
| 8 TIMES P.B. (10-46 SYNC. BLOCKS) (62-98 SYNC. BLOCKS) (113-145 SYNC. BLOCKS) | | | | | | | | | |
| 16 TIMES P.B. (0-9 SYNC. BLOCKS) (17-33 SYNC. BLOCKS) (41-57 SYNC. BLOCKS) (81-65 SYNC. BLOCKS) (89-105 SYNC. BLOCKS) (113-129 SYNC. BLOCKS) (137-148 SYNC. BLOCKS) | | | | | | | | | |

DIGITAL VCR WITH TRICK PLAY IMAGE CONTROL

This invention relates to the field of digital video recording, and in particular to reproduction of an high definition video signal at a non-standard speed.

BACKGROUND OF THE INVENTION

A digital video cassette recorder employing a helical scanning format has been proposed by a standardization committee. The proposed standard specifies digital recording of either standard definition (SD) television signals, for example NTSC or PAL, and high definition television signals having an MPEG compatible structure, such as a proposed Grand Alliance signal. The SD recorder utilizes a compressed component video signal format employing intra field/frame DCT with adaptive quantization and variable length coding. The SD track format comprises 10 μm tracks, azimuth recorded without guard bands, with 10 or 12 tracks per NTSC or PAL frame respectively. The tape cassette employs ¼" wide tape with an evaporated metal recording medium. The SD digital VCR or DVCR, is intended for consumer use and has sufficient data recording capability to record either NTSC (PAL) signals, or an advanced television signal.

An advanced television or ATV signal has been developed by the Grand Alliance (GA) consortium. A specification document titled Grand Alliance HDTV System Specification was published in the 1994 Proceeding of the $48^{th}$ Annual Broadcast Engineering Conference Proceedings. The GA signal employs an MPEG compatible coding method which utilizes an intra-frame coded picture, termed I frame, a forward predicted frame, termed a P frame and a bidirectionally predicted frame, termed a B frame. These three types of frames occur in a group known as a GOP or Group Of Pictures. The number of frames in a GOP is user definable but may comprise, for example, 15 frames. Each GOP contains one I frame, which is abutted by B frames, which are then interleaved with P frames.

In an analog consumer VCR, "Trick Play" or TP features such as picture in forward or reverse shuttle, fast or slow motion, are readily achievable, since each recorded track typically contains one field. Hence reproduction at speeds other than standard, result in the reproducing head, or heads, crossing multiple tracks, and recovering recognizable horizontal picture segments. The GOP of an ATV signal, employing I, P and B frames, may be recorded occupying multiple tracks on tape, for example, 10 tracks per frame and 150 tracks per GOP. Simply stated, when a DVCR is operated at a non-standard reproduction speed, replay heads transduce sections or segments from multiple tracks. Unfortunately these track segments no longer represent sections from discrete records of consecutive image fields. Instead, the segments contain data resulting mainly from predicted frames of the GOP. During play speed operation, I frame data is recovered which permits the reconstruction of the predicted B and P frames. Clearly, during "Trick Play" operation, the amount of I frame data recovered progressively diminishes as TP speed increases. Hence, the possibility of reconstructing B and P frames from the reproduced pieces of I frame data is virtually zero. Thus, the provision of "Trick Play" or non-standard speed replay features requires that specific data be recorded, which when reproduced in a TP mode, is capable of image reconstruction without the use of adjacent frame information. Furthermore, since "Trick Play" specific data is recorded, the physical track location must be such to permit recovery in a TP mode.

SUMMARY OF THE INVENTION

In accordance with an inventive arrangement a digital video recorder for reproducing digital image signals at different reproducing speeds, said recorder comprises: a transducer for recovering a digital signal from a recorded medium, the digital signal having a first data signal representing the digital image signals and a second data signal representing a processed form of the digital image signals; means coupled to the transducer for separating the digital signal into the first and the second data signals; means responsive to a selection of one of the selected reproducing speeds and at least one of the first and second data signals for generating an image source control signal; and, selecting means coupled to the separating means and responsive to the control signal for selecting between the first and second data signals as output image sources.

In accordance with another inventive arrangement a digital video recorder employing a helical scanning format for reproducing a digital image signal, the recorder comprises: a play back transducer for transducing a digital signal from a recorded medium, the digital signal having a first data signal, having a compatible MPEG format and representing the digital image signal and a second data signal having a compatible MPEG format and representing a processed form of the digital image signal; means coupled to the transducer for separating the digital signal into the first and the second data signals; selecting means coupled to the separating means and responsive to a control signal for selecting the second data signal at initiation of reproduction and selecting the first data signal following reproduction of an I frame identifying signal from the first data signal; and, decoding means coupled to an output of the selecting means for generating the digital image signal from the first and the second data signals.

BRIEF DESCRIPTION OF THE DRAWING

FIGS. 6A–6B contain tables showing audio and video sync-blocks recovered at various trick mode replay speeds.

DETAILED DESCRIPTION

Figure 1:
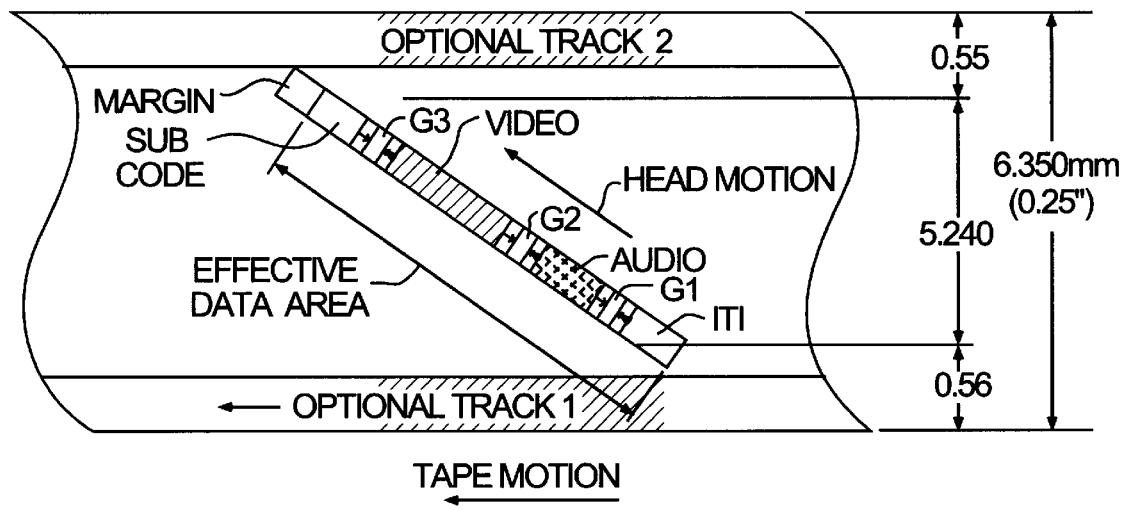
FIG. 1 illustrates a recorded track pattern showing the locations of various data sectors as specified for a standard definition DVCR.
Figure 21:
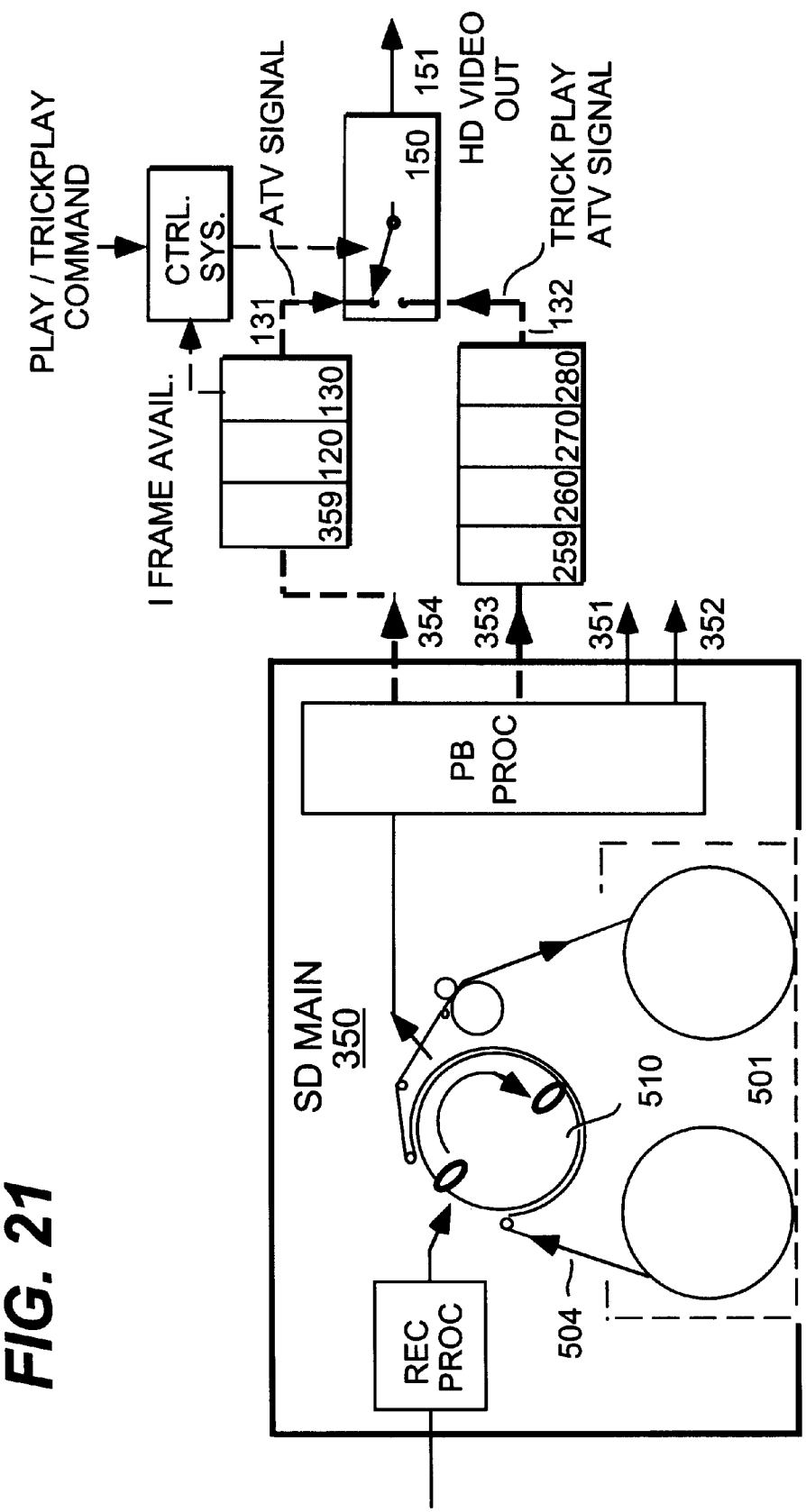
FIG. 21 is a system block diagram showing an SD recorder and inventive control of "Trick Play" and high definition video playback.

FIG. 1 shows a recorded track format for a consumer use, standard definition (SD), helical scan, digital video cassette recorder. The effective data area shown in FIG. 1 comprises four sectors in which specific types of data are recorded. The ITI, or Insert and Track Information data sector is used for tracking and editing, and is followed by an editing gap G1. An audio data sector occupies 14 sync blocks, numbered 0–13. A second editing gap G2, follows the audio data sector, which is followed by a video data sector comprising 149 sync blocks, numbered 0–148. A third editing gap G3 follows the video data sector which is in turn followed by a sub code recording sector. The digital video cassette recorder or DVCR, is specified to have a digital video recording rate of 24.948 Mbps. This video bit rate may be utilized for recording a component video signal decoded from either an NTSC (PAL) signal, or a processed advanced television signal, such as for example, the GA signal. FIG. 21 shows, a simplified block diagram of a DVCR 350. DVCR 350 comprises a head drum 510 which includes a plurality of recording and reproducing heads which are coupled to a playback processor that generates four output signals, 351, 352, 353 and 354. Replay signal 354 represents an ATV data stream and the data processing path is depicted by blocks 359, 120 and 130. "Trick Play" image data is represented by replay signal 353 which is shown coupled to subsequent "Trick Play" image data processing. The processing and selection between "Trick Play" and ATV images will be described later. A cassette 501, is shown inserted into DVCR 350, with tape 504 threaded around the head drum 510.

The SD track format may be recorded with various head placements on the drum or cylinder, and with various drum rotational speeds. The track patterns which follow illustrate replay head paths or tracks for various "Trick Play" speeds. In addition, two possible head drum configurations are illustrated, i.e. a double azimuth head pair, and two single heads 180° diametrically opposed on the drum.

FIGS. 2–5 illustrate replay head paths for a selection of "Trick Play" reproduction speeds. The tape is recorded according to the SD, digital video cassette recorder format, with 10 μm tracks, azimuth recorded without guard bands, and is illustrated replayed by a replay head with pole face width of 15 μm.

Figure 2:
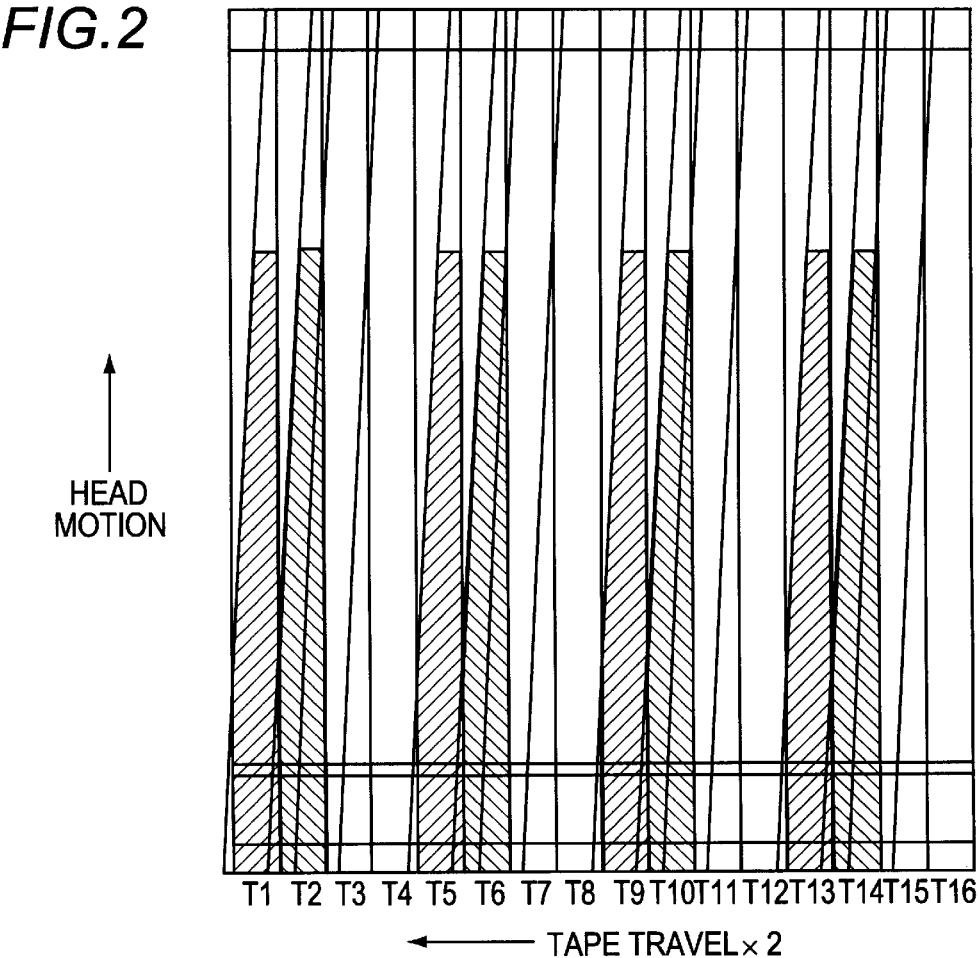
FIG. 2 illustrates the replay head path with areas of sync block recovery at twice replay speed.

FIG. 2 illustrates the replay head path or footprint, at twice speed reproduction. The footprint shown is for a single pair of double azimuth replay heads. It is assumed that the replay head will recover sync block data from the recorded track until half the recorded track width is scanned. The FIGURES depict track areas of sync block data recovery by cross hatching.

Figure 3:
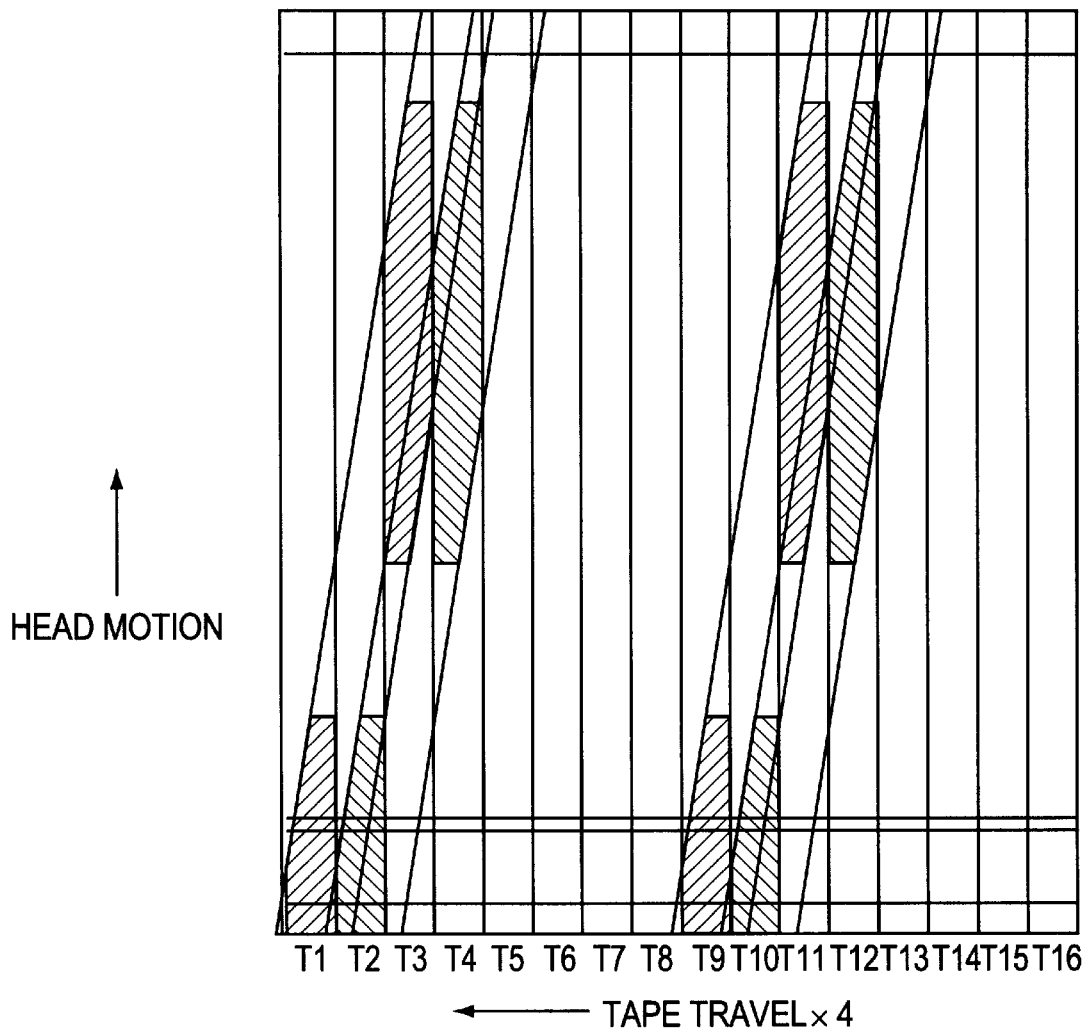
FIG. 3 illustrates the replay head path with areas of sync block recovery at four times replay speed.
Figure 4:
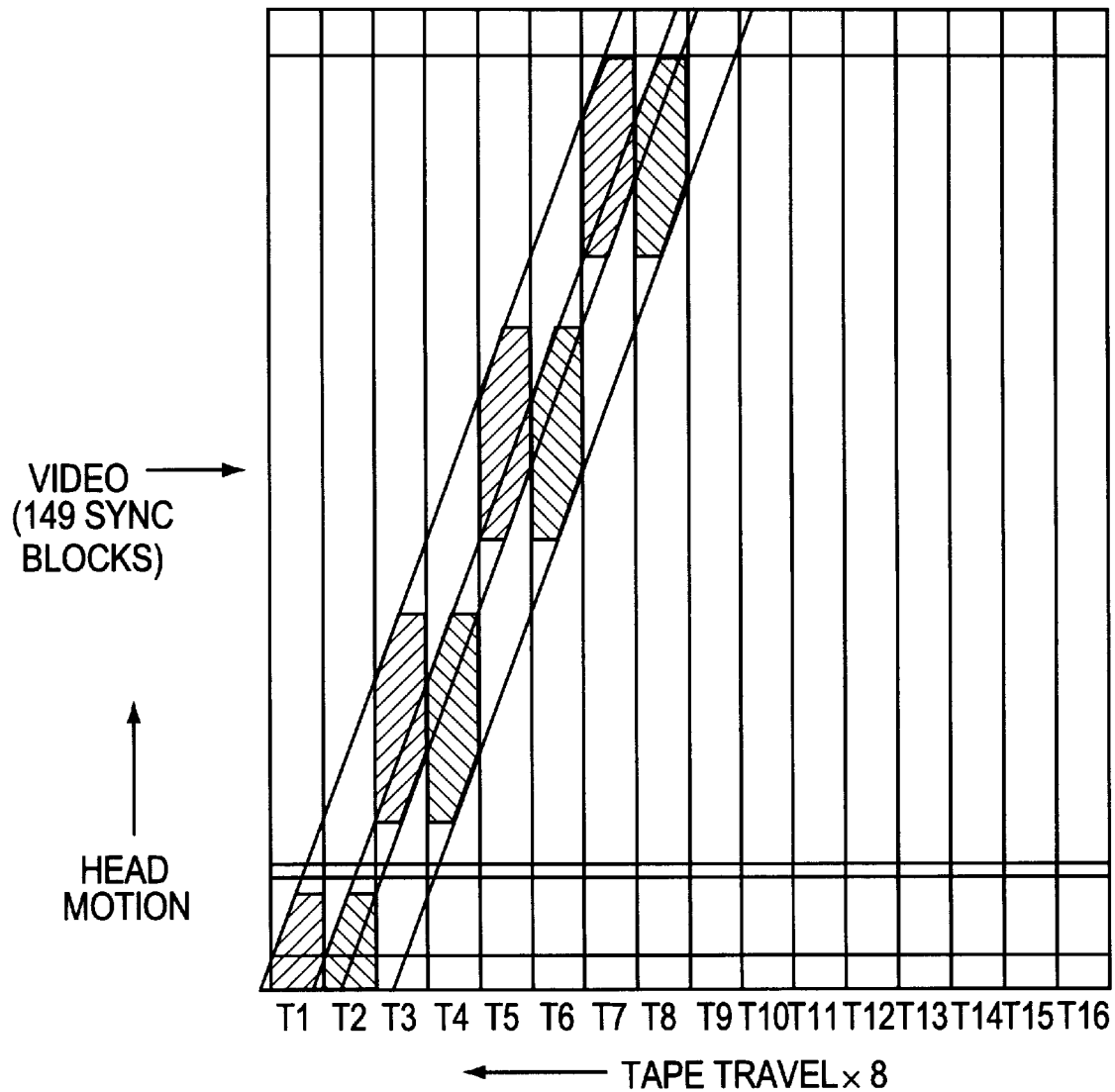
FIG. 4 illustrates the replay head path with areas of sync block recovery at eight times replay speed.
Figure 5:
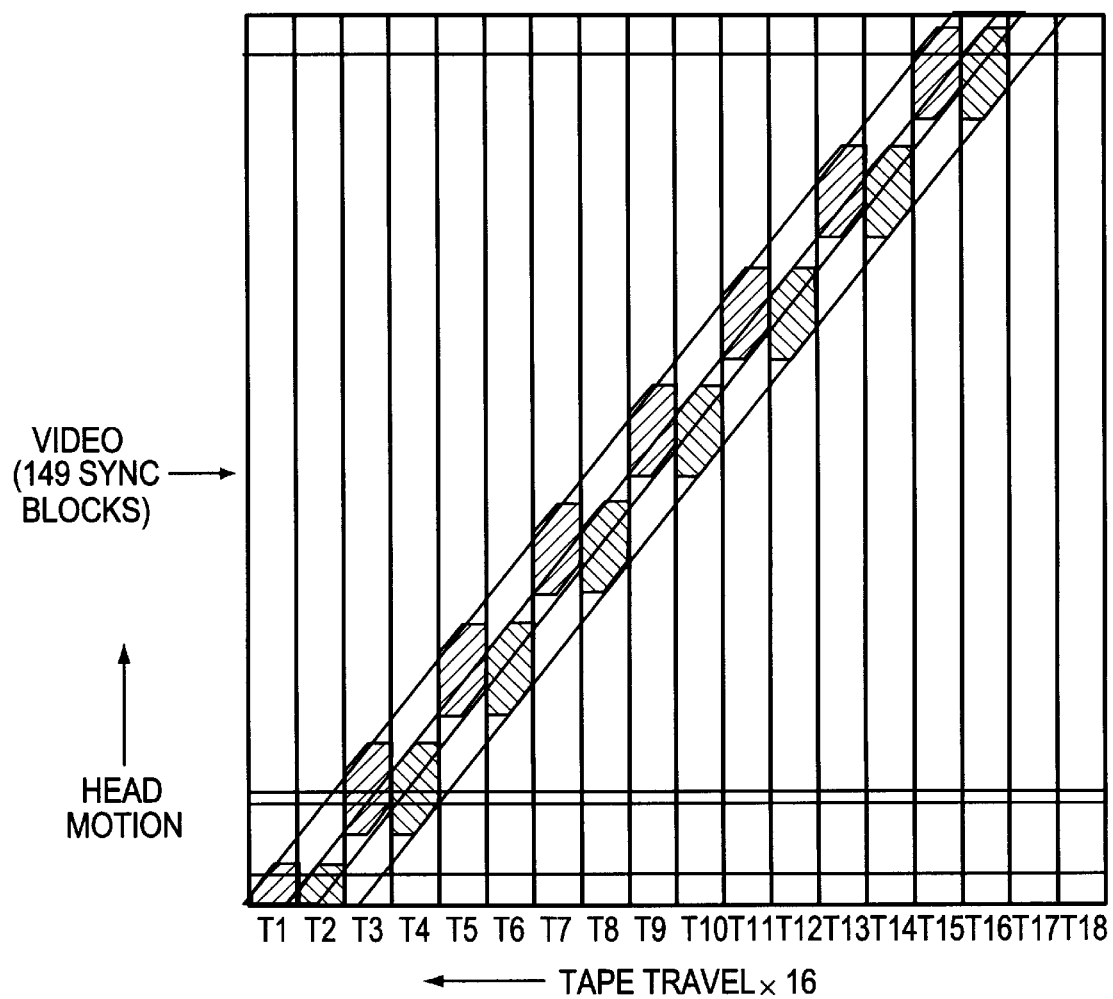
FIG. 5 illustrates the replay head path with areas of sync block recovery at sixteen times replay speed.

FIGS. 3, 4 and 5 illustrates the replay footprints at four, eight and sixteen times play speed respectively.

FIG. 6A is a table showing track numbers and the numbered sync blocks recovered from the audio data sector at the TP speeds illustrated in FIGS. 2–5. FIG. 6B shows the tracks, and numbered sync blocks, recovered from the video data sector at the Trick Play speeds illustrated.

Figure 7A:
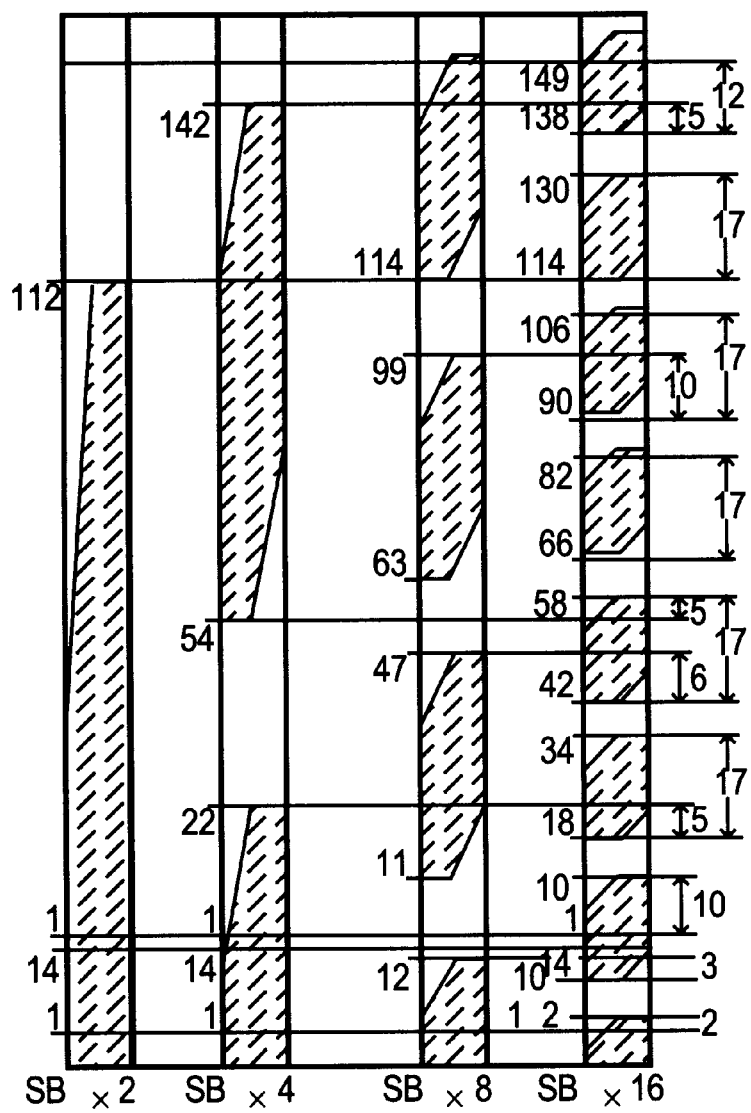
FIG. 7A illustrates sync-blocks recovered at 2, 4, 8 and 16 times replay speeds.
Figure 7B:
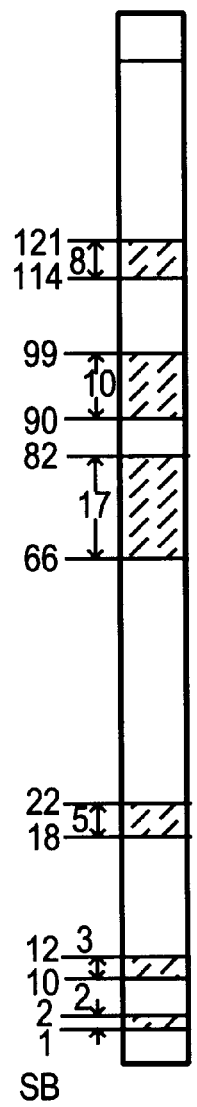
FIG. 7B illustrates recovered sync-blocks common to 2, 4, 8 and 16 times replay speeds.

The recovered video sync block data depicted by cross hatching in FIGS. 2, 3, 4 and 5, and the numbered sync blocks, of table FIG. 6B, are combined and illustrated in FIG. 7A for TP speeds of 2, 4, 8 and 16 times. FIG. 7B illustrates track areas and numbered sync blocks recovered, which are common to all four speeds. Thus FIG. 7B indicates track locations, identified by sync block number, where data may be recorded and recovered at play speed and at 2, 4, 8 and 16 times play speed.

Figure 8:
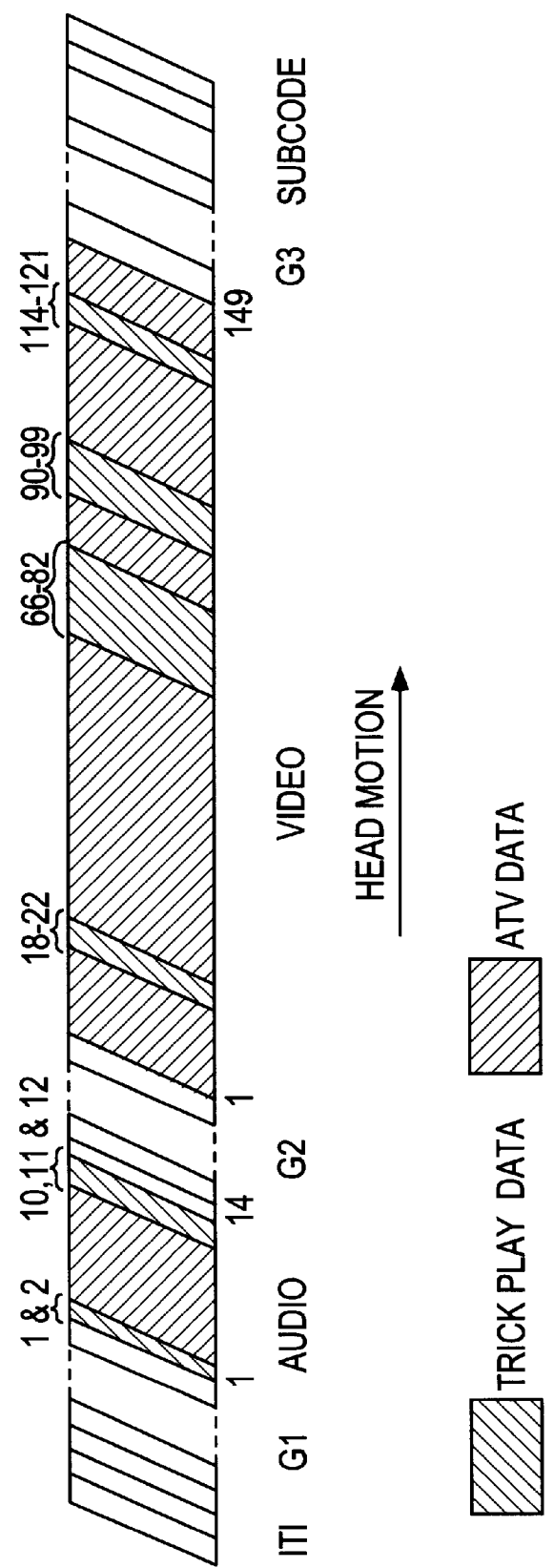
FIG. 8 illustrates a first embodiment of a recorded track pattern showing advantageous sync block locations for placement of inventive "Trick Play" data.

FIG. 8 shows one recorded track comprising an ITI, or Insert and Track Information recording area, editing gap G1, an audio data recording area occupying 14 sync blocks, numbers 0–13. During ATV operation audio and video data are conveyed within the ATV data transport stream thus the audio data sector is not required for audio data use and may be utilized for ATV and "Trick Play" data recording. A second editing gap G2, follows the audio data sector and it is followed by a video data recording sector comprising 149 sync blocks, numbered 1–149. A third editing gap G3 follows the video data sector which is in turn followed by a sub code recording area. The recorded track of FIG. 8 shows an advantageous first embodiment of sync block allocation for inventive TP data recording, where 5 sync blocks are used in the audio sector, and 40 sync blocks are utilized in the video sector. Thus 45 sync blocks may be utilized in each scan to record TP video data for recovery at both standard and nonstandard play speeds. These 45 TP sync blocks provide an effective replay data rate of about 1.06 Mbit/sec at nominal speed.

Figure 9:
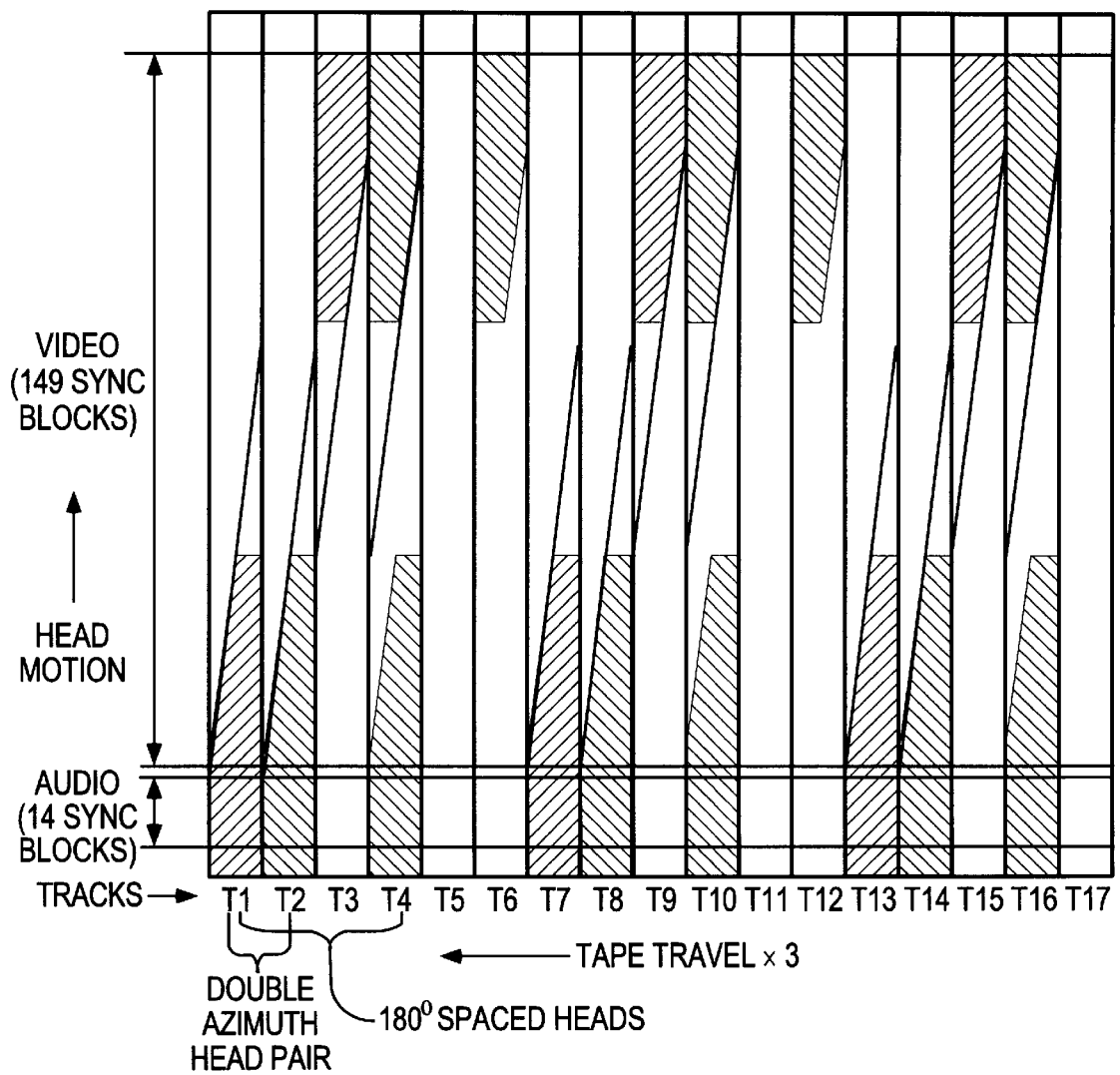
FIG. 9 illustrates the replay head path and track areas of sync block recovery at 3 times play speed.
Figure 10:
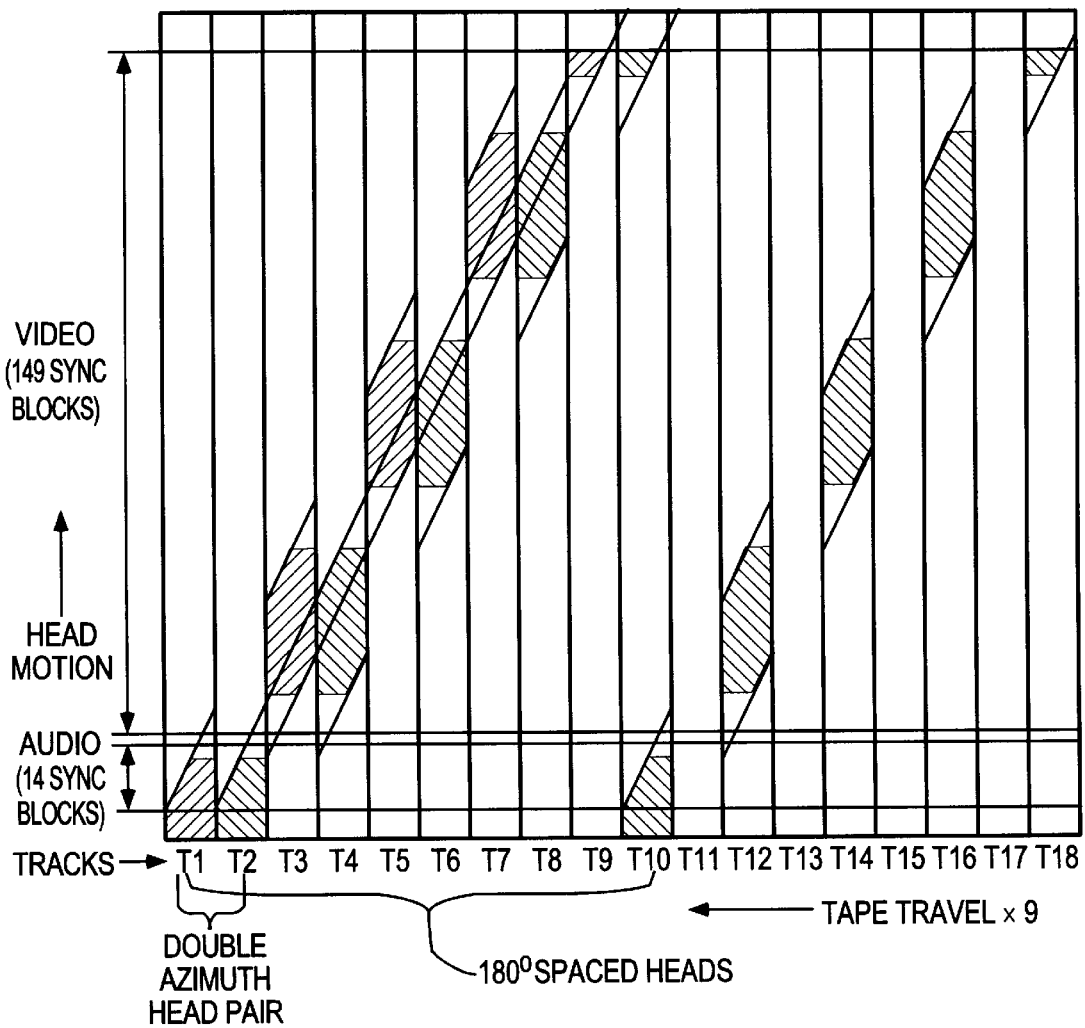
FIG. 10 illustrates the replay head path and track areas of sync block recovery at 9 times play speed.
Figure 11:
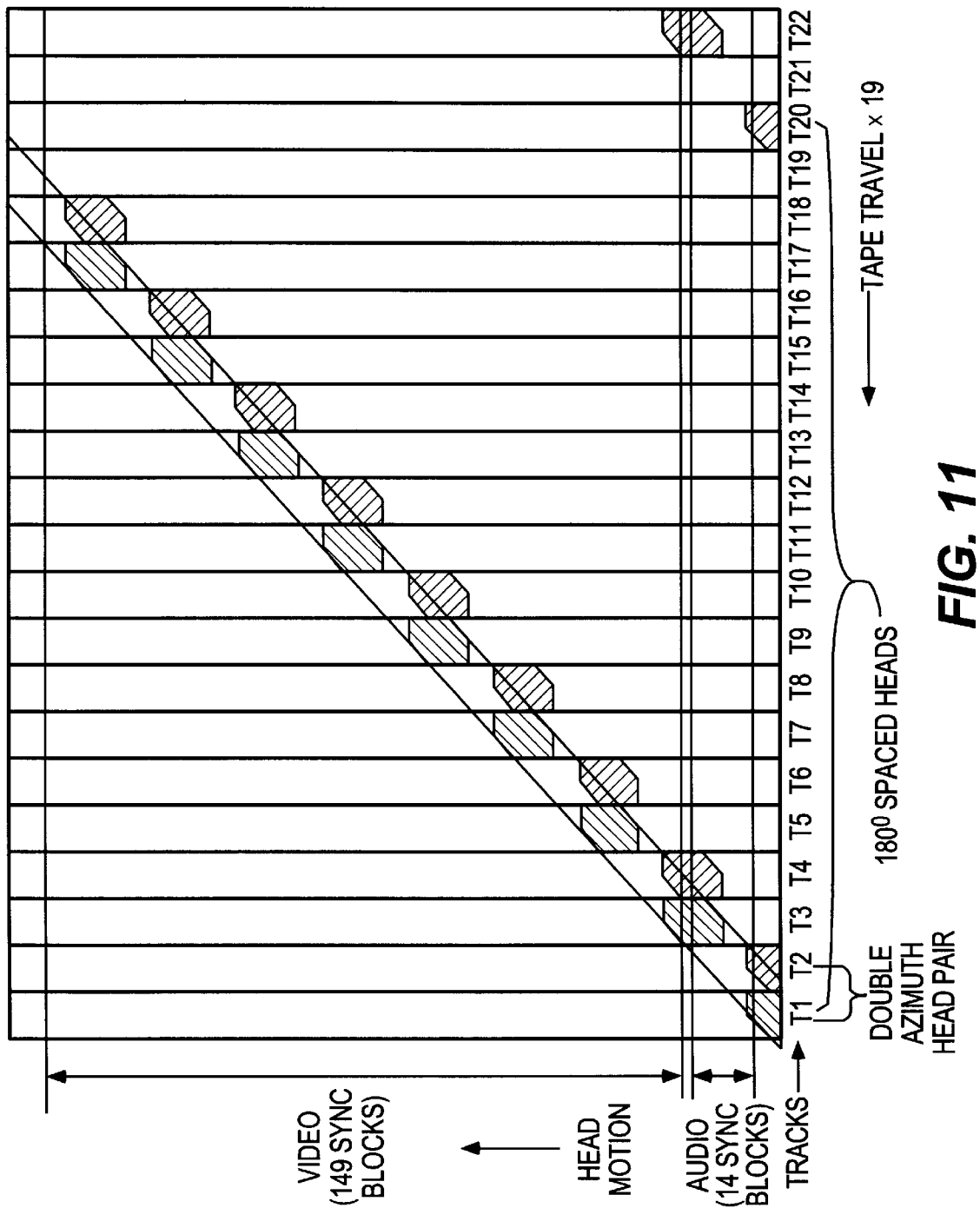
FIG. 11 illustrates the replay head path and track areas of sync block recovery at 19 times play speed.

FIGS. 9–11 illustrate replay head paths for "Trick Play" speeds of 3 times, 9 times and 19 times, with head footprints for both double azimuth and 180° diametrically opposed heads.

FIG. 9 illustrates track areas of sync block recovery at 3 times play speed. Tracks T1 and T2 represent reproduction with double azimuth head pair, tracks T1 and T4 represent reproduction by 180° opposed heads. FIG. 9 shows that for either type of replay head configuration there are areas of the track, and consequently sync blocks, which are never recovered.

FIG. 10 illustrates track areas of sync block recovery at 9 times play speed. Tracks T1 and T2 represent reproduction with double azimuth head pair, tracks T1 and T10 represent reproduction by 180° opposed heads.

FIG. 11 illustrates track areas of sync block recovery at 19 times play speed. Tracks T1 and T2 represent reproduction with double azimuth head pair, tracks T1 and T20 represent reproduction by 180° opposed heads.

Figure 12:
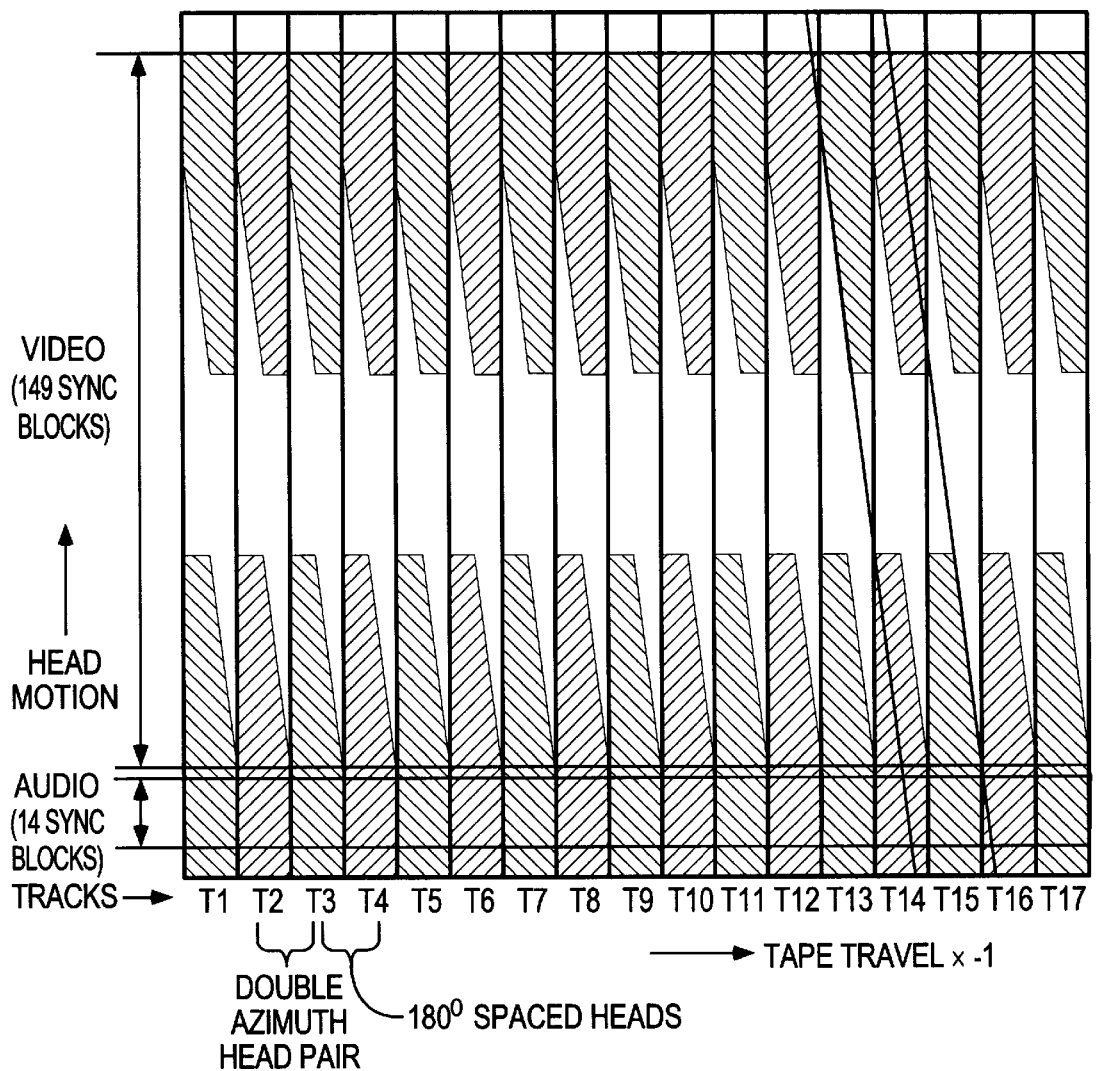
FIG. 12 illustrates the replay head path and track areas of sync block recovery at minus 1 times play speed.

FIG. 12 illustrates track areas of sync block recovery at minus 1 times play speed. Tracks T3 and T4 represent reproduction with double azimuth head pair, tracks T3 and T2 represent reproduction by 180° opposed heads.

Figure 13:
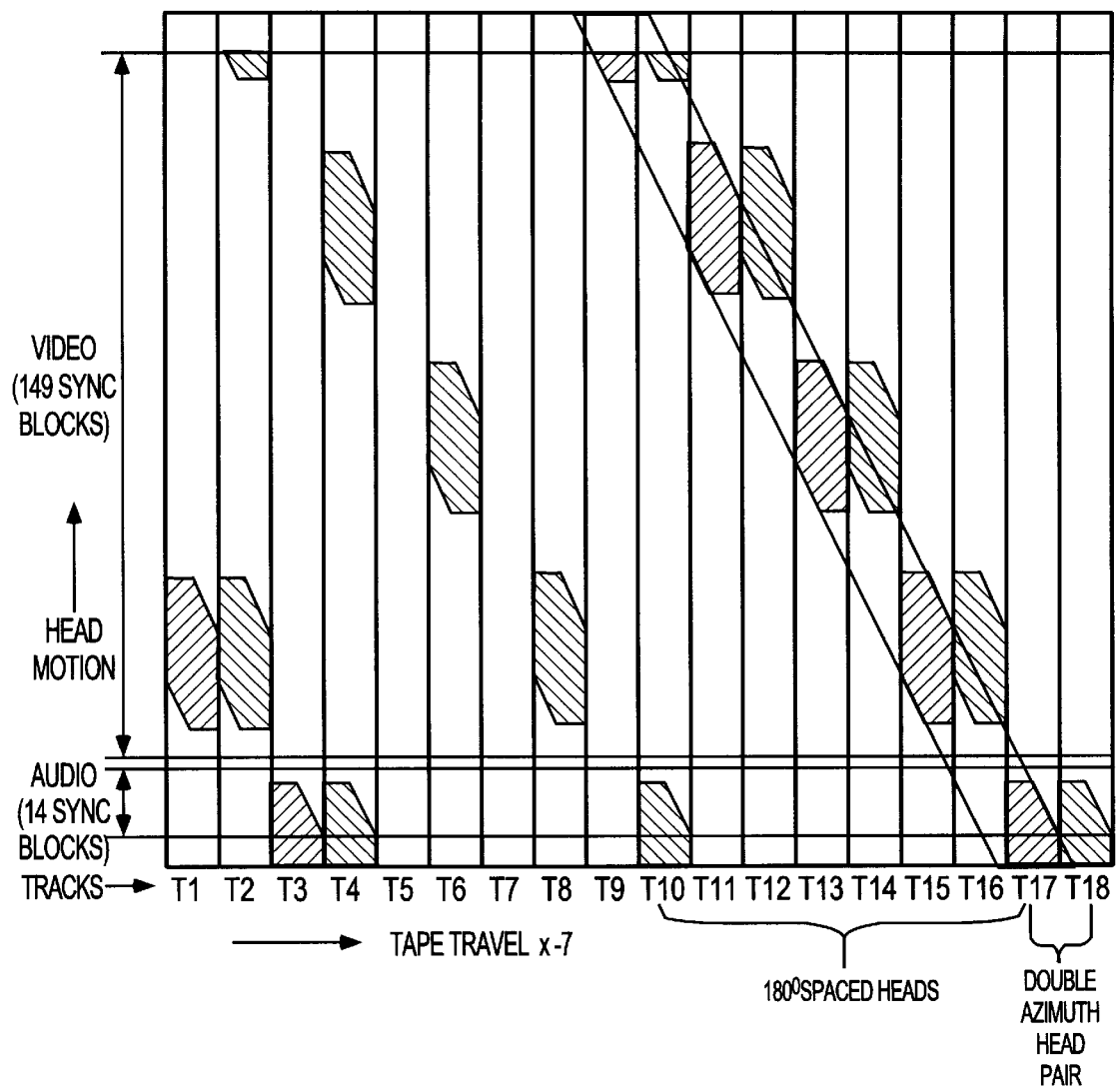
FIG. 13 illustrates the replay head path and track areas of sync block recovery at minus 7 times play speed.

FIG. 13 illustrates track areas of sync block recovery at minus 7 times play speed. Tracks T17 and T18 represent reproduction with double azimuth head pair, tracks T17 and T10 represent reproduction by 180° opposed heads.

Figure 14:
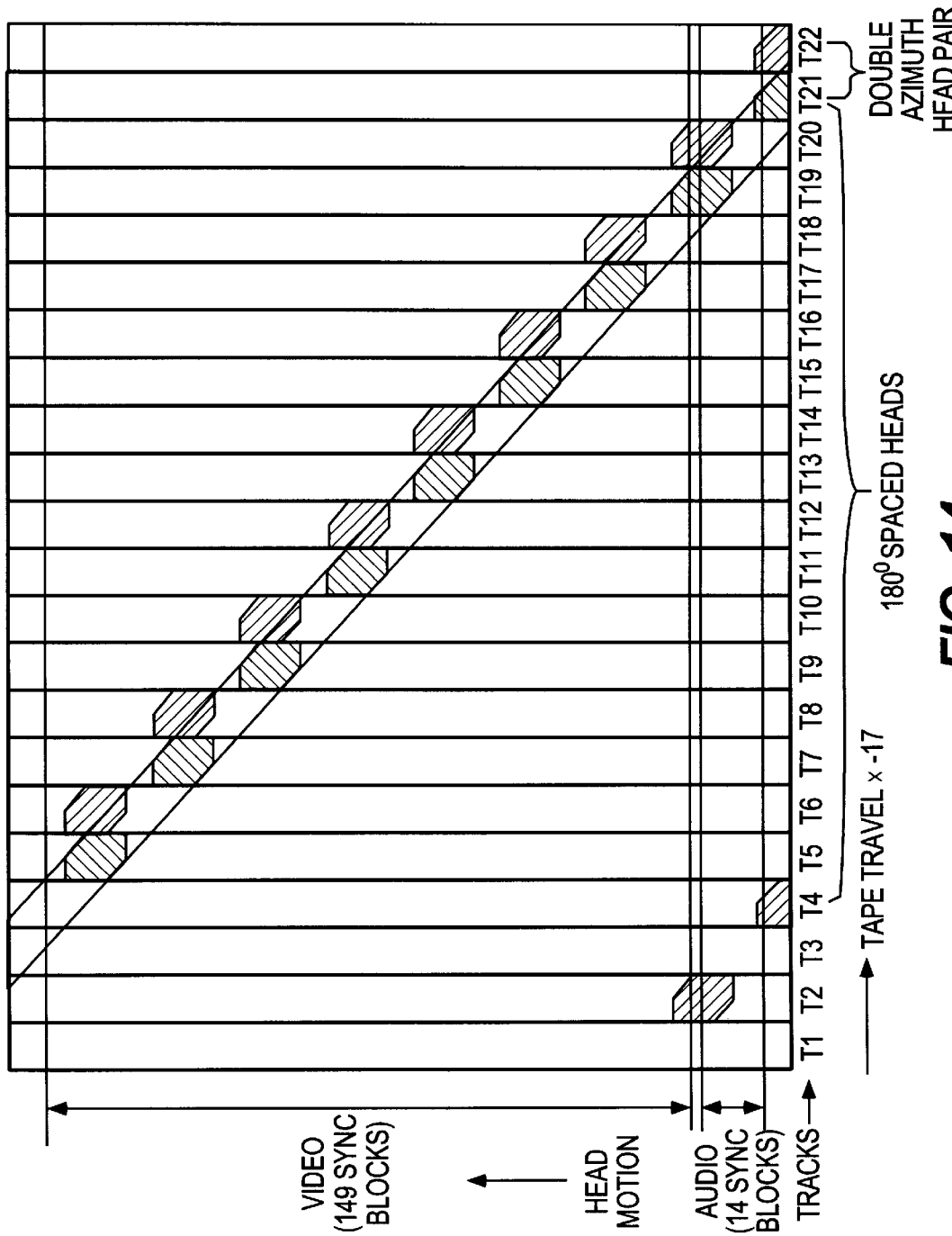
FIG. 14 illustrates the replay head path and track areas of sync block recovery at minus 17 times play speed.

FIG. 14 illustrates track areas of sync block recovery at minus 17 times play speed. Tracks T21 and T22 represent reproduction with double azimuth head pair, tracks T21 and T4 represent reproduction by 180° opposed heads.

Figure 15:
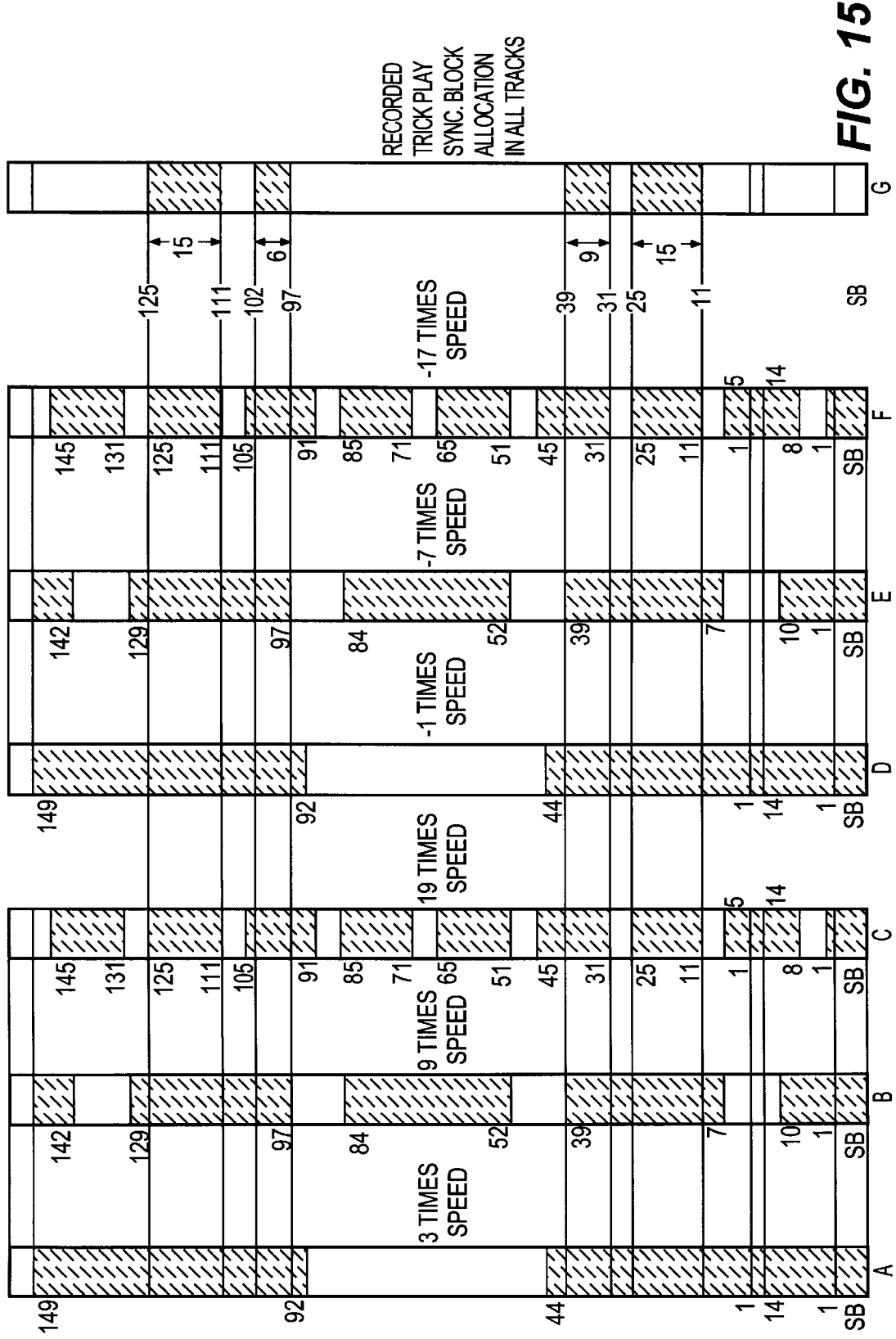
FIG. 15 illustrates sync-blocks recovered at 3, 9 and 19 times forward play speeds and 1, 7 and 17 times play speed in the reverse direction.

The sync blocks recovered at the various forward and reverse speeds shown in FIGS. 9–14, are combined and illustrated as single tracks. FIG. 15A, illustrates numbered sync blocks at 3 times speed, FIG. 15B, shows SBs recovered at 9 times speed, FIG. 15C, for 19 times speed, FIG. 15D, for minus 1 times speed, FIG. 15E, for minus 7 times speed, and FIG. 15F, for minus 17 times speed. FIG. 15G represents analysis of the recovered sync blocks for commonalty. Thus FIG. 15G shows numbered sync blocks which are recovered at 3, 9 and 19 times in the forward direction and 1, 7 and 19 in reverse directions.

Figure 16:
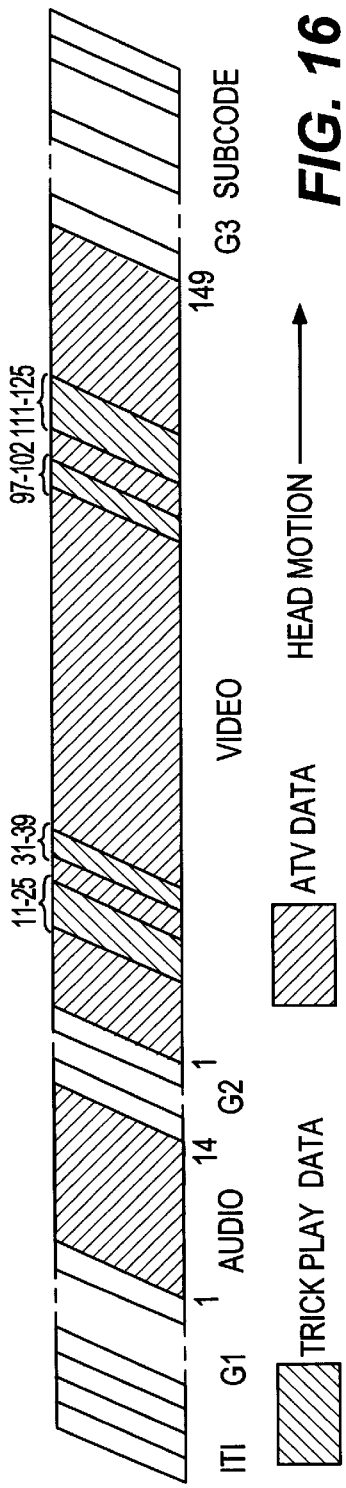
FIG. 16 illustrates a second embodiment of a recorded track pattern showing inventive sync block locations for recording inventive "Trick Play" data.

FIG. 16 illustrates a second embodiment having advantageous track locations, identified by sync block number, where 45 sync blocks of inventive "Trick play" video data may be recorded and recovered at play speed and at play speeds of 3, 9 and 19 times in the forward direction and 1, 7 and 17 times in the reverse direction.

Figure 17:
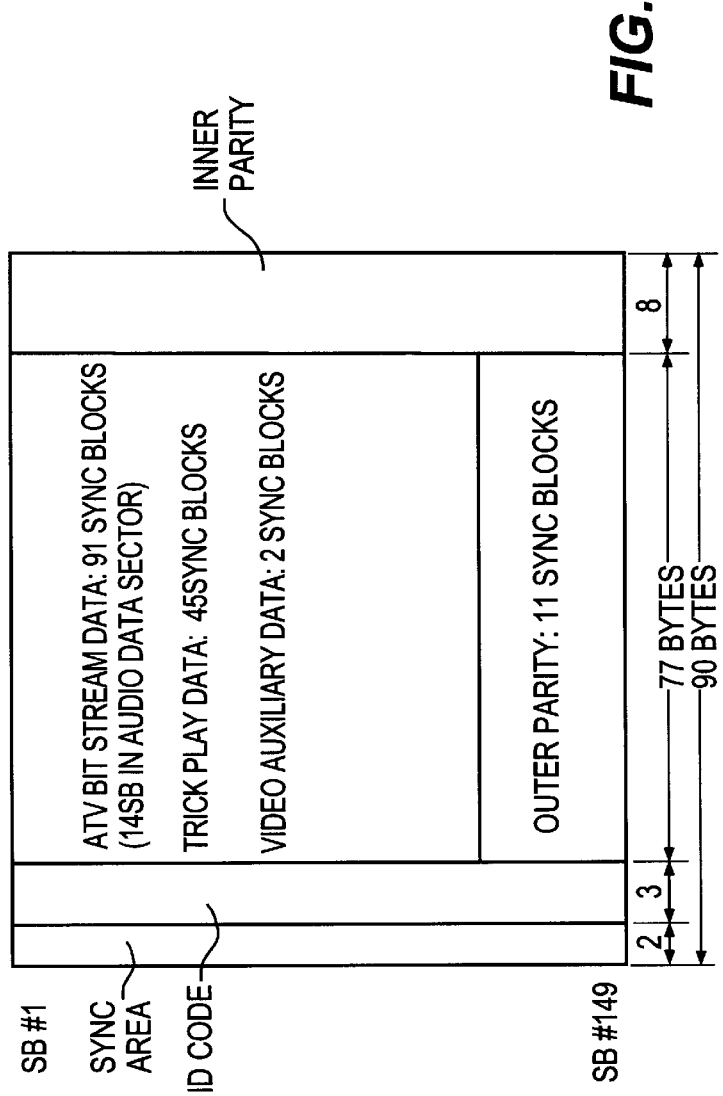
FIG. 17 illustrates a video data sector recorded with an ATV signal and an inventive "Trick Play" signal.

An ATV bit stream may be recorded in the data capacity of 105 sync blocks, which are composed of 14 sync blocks from the audio data sector and 91 SB from the video data sector. The inventive "Trick Play" video data may be recorded using 45 SB within the video data sector. In FIG. 17, a video data sector is illustrated showing sync block (SB) structure for an ATV data recording.

Figure 18A:
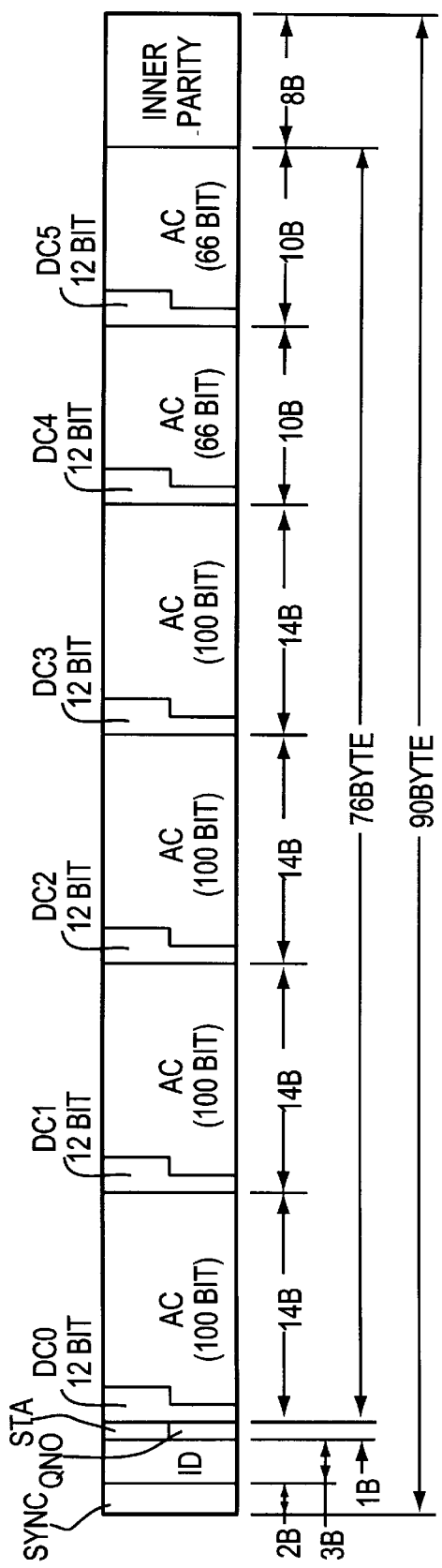
FIG. 18A illustrates the arrangement of data within a SD sync block.
Figure 18B:
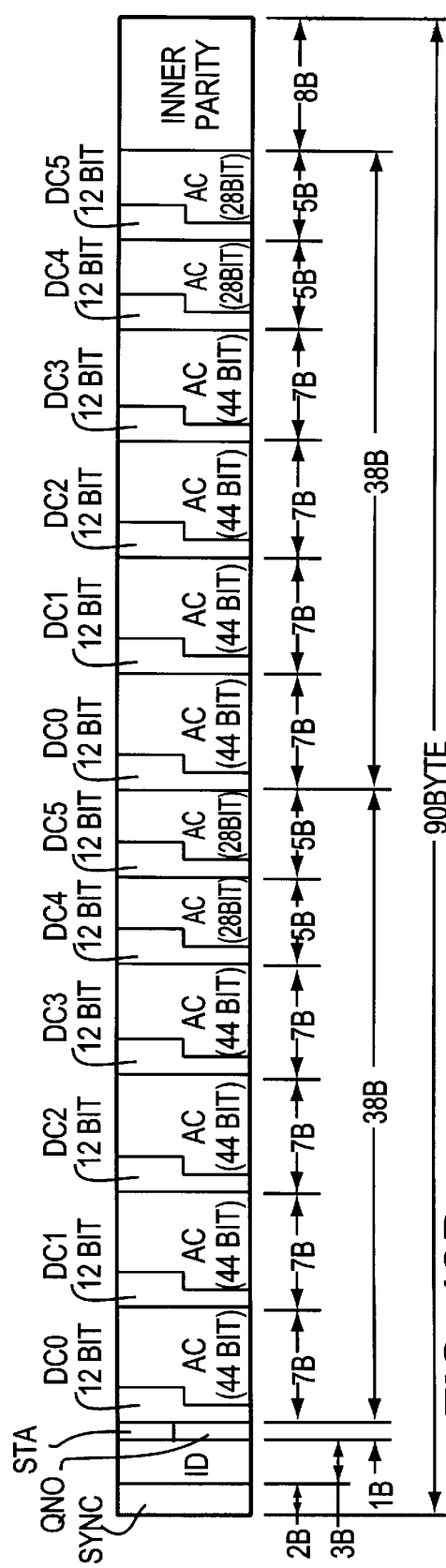
FIG. 18B illustrates a sync block advantageously formatted for recording both ATV and inventive "Trick Play" data signals.

FIGS. 18 A and B illustrate the data structure of a sync block, SB, within the video data sector. FIG. 18A illustrates a standard definition or SD formatted sync block. The SD sync block comprises 90 bytes, with 77 bytes containing 6 groups of discrete cosine transformed or DCT coefficient data. Each DCT group comprises a DC coefficient value followed by AC coefficient values in descending order of significance. FIG. 18B illustrates a sync block formatted with inventive "Trick Play" data. "Trick Play" data is compressed, discrete cosine transformed and variable length coded, as will be described for FIG. 20. Two compressed TP macro blocks may be recorded in one sync block, formatted as shown in FIG. 18B.

Having identified sync block locations advantageous to "Trick Play" reproduction in both forward and reverse directions at various speeds, "Trick Play" video data must be derived from the ATV data stream. As described earlier, TP sync blocks recovered during "Trick Play" mode replay, must be capable of decoding to produce images without reference to, or prediction from, adjacent image frames. Clearly "Trick Play" video data may be derived from intraframe or I frame coded video. However, derivation of "Trick Play" video exclusively from I frames may, as a consequence of the low repetition rate of I frames within each GOP, result in stroboscopic or jerky rendition of motion in "Trick Play" modes. Thus, to avoid jerky "Trick Play" motion, video for "Trick Play" record processing is advantageously derived from video, decoded from the ATV or MPEG like data stream. Hence every decoded picture, derived from I, P or B frames, is processed to generate corresponding "Trick Play" frames for recording. Thus each recorded frame in a GOP contains a corresponding "Trick Play" processed image which, during "Trick Play" reproduction, may be decoded to provide images in which motion is smoothly portrayed.

The DVCR format allocates ten recorded tracks to one ATV frame, thus the same number of recorded tracks is selected for the "Trick Play" video data. The ATV data may be allocated 105 SB per track, thus a recorded ATV frame corresponds to 1050 SBs. Since "Trick Play" video data may be allocated 45 sync blocks per video sector, a total of 450 SBs are utilizable for "Trick Play" data recording. Hence each "Trick Play" video frame must be compressed to occupy the data capacity provided by the 450 sync blocks. The required degree of the "Trick Play" video data compression may be represented by 450:1050 or approximately 2.3 to 1.

Figure 19:
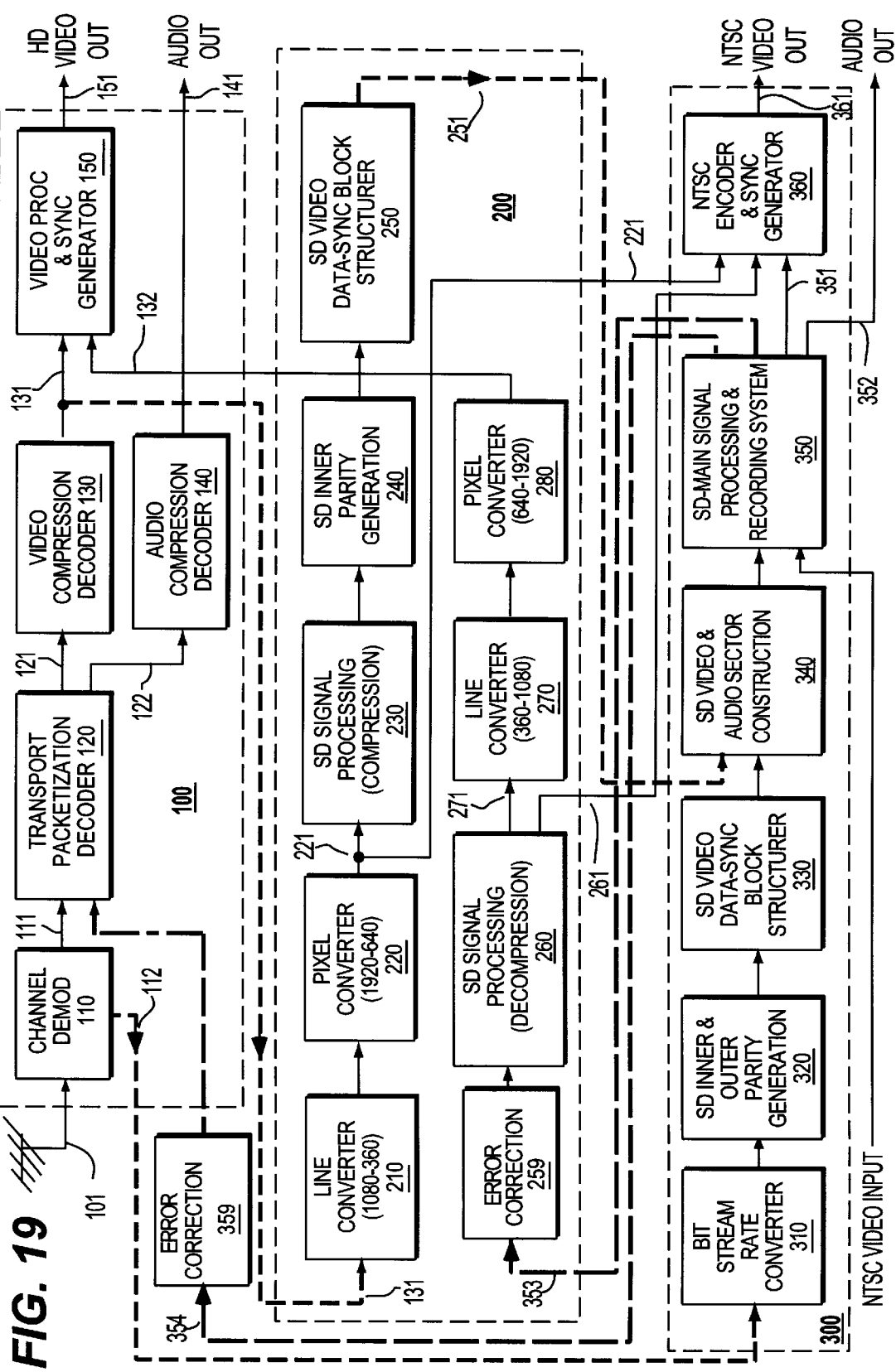
FIG. 19 is a system block diagram of an ATV digital video cassette recorder employing an inventive "Trick Play" recording and replay features.

FIG. 19 is a block diagram of an advanced television receiver employing an inventive method of Trick Play mode processing for recording an MPEG like data stream on a standard definition or SD, digital video cassette recorder. The block diagram comprises an ATV decoder 100, a Trick Play processor 200, and an SD DVCR 300. An exemplary RF modulated advanced television signal is received by an antenna 101, and is coupled to an input of an ATV decoder 100. The RF modulated signal may also be delivered to decoder 100 via a cable distribution system. Decoder 100 comprises a channel demodulator 110, which extracts the modulated, MPEG like, ATV bit stream signal from the RF carrier. The bit stream has a data rate of 19.3 Mbs, and is coupled as output signals 111 and 112. Bit stream 111 is coupled to a transport packetization decoder 120, which in simple terms, separates video data packets 121, from audio data packets 122. The video data packets 121 are coupled to a video compression decoder 130 which reconstructs HD video image signals. The video signals 131, are coupled to a video processor and sync generator 150, which generates at output 151, the original 16:9 aspect ratio high definition video signals, for example, luminance and color difference signals Cr and Cb. The video processor and sync generator 150, also receives a second input signal 132 from pixel converter 280, of the Trick Play processor 200. The audio data packets 122 are coupled to an audio compression decoder 140 which extracts and regenerates the original audio signals which form audio output signals 141.

The MPEG like bit stream signal 112, is coupled to a bit stream rate converter 310, which converts the 19.3 Mbs bit stream to a data rate of 24.945 Mbs, as required for processing and recording by the SD recorder. The output from rate converter 310 is coupled to an inner and outer parity generator 320 which generates Reed Solomon error correction codes which are included in the video data recorded in the video sector, as depicted in FIG. 1. Following the insertion of RS error correction codes the data stream is coupled to an SD video data sync block structurer 330, which constructs video data-sync block structure required by the SD recorder format.

Block 340 of FIG. 19, constructs audio and video sectors according to the SD format, where video data sector includes processed ATV data from block 330, plus inventive "Trick Play" video data 251, from block 250 of "Trick Play" video processor 200.

The SD video sector format or structure, is illustrated in FIGS. 17, 18A and 18B. FIGS. 18A and 18B show the sector comprises a video preamble, 149 sync blocks of video data and error correction code, and a video post-amble. The sync blocks are numbered 1 through 149. FIG. 18A depicts an SD format employed during the recording of an NTSC image source. FIG. 18B shows ATV video data advantageously recorded occupying, for example, 105 sync blocks. Inventive "Trick Play" video data may be recorded occupying, for example, 45 sync blocks and video auxiliary data may be recorded with 2 sync blocks. Outer parity error correction data is recorded using 11 sync blocks.

The ATV video sector data, including "Trick Play" data and audio sector signals are coupled from block 340 to a standard definition or SD digital video cassette recorder 350. The SD recorder may also receive an analog NTSC (PAL) input signal for recording. The analog signal is decoded into luminance and color difference components and, for NTSC input signals, the components are 4:1:1 sampled at 13.5 MHz and digitized to 8 bits. The digitized NTSC signal is compressed according to the SD recording format which employs intra-field/frame DCT applied to 8×8 image blocks, followed by adaptive quantization and modified two dimensional Huffman encoding. The image blocks are shuffled, or redistributed, throughout each frame to prevent recording media damage producing uncorrectable data errors. Since the image blocks are shuffled prior to recording, any large media related reproduction errors will be distributed throughout the decoded frame as a result of complementary deshuffling employed during reproduction. Thus large potentially uncorrectable, and therefor visible errors, are distributed and may be correctable by the inner and outer Reed Solomon error correction codes. Following compression, the data is coded for recording using a 24:25 transformation which allows frequency response shaping to provide auto tracking capabilities on replay.

The SD recorder 350 reproduces four output signals, 351, 352, 353 and 354. Output signals, 351 and 352 are base band analog signals comprising, video components Y, Cr and Cb, and audio signals respectively. Signal 351 comprises video components which are coupled to an NTSC sync generator and encoder 360, which provides blanking and sync pulse addition for video monitor viewing. The components may be encoded to produce an NTSC signal for viewing on a standard definition TV receiver.

SD recorder 350 generates an ATV data bit stream output signal 354, and a "Trick Play" data bit stream output signal 353. Signal 353 is coupled via error correcting block 259 to block 260 of the ATV and "Trick Play" processor 200 for decompression and subsequent up conversion to an ATV signal format. The operation of "Trick Play" processor 200 will be described with reference to FIG. 20.

Data bit stream 354, is coupled via error correcting block 359 to block 120 of ATV decoder 100, where the replayed transport packets are decoded. A decoded ATV signal 131, is coupled from the video compression decoder 130, to line rate converter 210, of the ATV and "Trick Play" processor 200. The ATV signal comprises luminance and color difference signals, Cr and Cb, and may for example, comprise 1080 active horizontal scan lines each having 1920 pixels or samples. Line rate converter 210, reduces the number of active scan lines to one third, or 360 lines. Thus the luminance and color difference signals which are processed to form a "Trick Play" video signal having one third of the vertical resolution of the original ATV signal. The line number conversion is performed by a vertical low pass filter function. The line rate reduced signal from converter 210 is coupled to a pixel converter 220 which reduces the number of pixels to one third by low pass filtering. Thus, signal 221 comprises 360 horizontal lines each containing 640 pixels, and ATV signal 131, has been transformed, or down converted, into a signal having "NTSC" like parameters. Since the ATV signal had an aspect ratio of 16:9, so to will signal 131. However, the down converted signal 221 will display the 16:9 image in a letter box format.

The down converted signal 221 is also coupled to NTSC encoder 360 for sync and blanking addition and encoding for standard definition viewing on a receiver or video monitor. Signal 221 is also coupled to a signal compression processor represented by block 230, the details of which will be described with respect to FIG. 20. However, in simple terms, the purpose of signal compression processor 230 is to generate a compressed form of the down converted ATV signal. For example, signal compression processor 230, may compress signal 221 by approximately 2.3 times.

The compressed, down converted signal is utilized to provide "Trick Play" video data for recording at specific sync blocks within each track, for example, as shown in FIGS. 8 and 16. Data for each TP video frame is recorded within the ten tracks which comprise each ATV SD recorded frame. Thus TP video data may be considered to be redundantly recorded within the video data sectors of the tracks comprising an ATV SD frame. During normal speed playback, TP video data is reproduced together with the ATV data but may not be used in the formation of an ATV image. However, since a "Trick Play" data frame occurs in every ten recorded tracks, these TP frames may be recovered during normal playback and stored to be utilized during a replay mode transition. For example, a transition from normal speed forward playback to high speed "Trick Play" or picture in shuttle. In a worst case situation, when a normal speed replay is initiated, approximately 140 recorded tracks may be reproduced before an I frame is recovered. However, since TP data frames are advantageously recorded throughout each GOP, "Trick Play" processed images may be produced immediately following the reproduction of any frame type. Thus a "Trick Play" processed image may be available to be output during the initiation of a normal speed replay prior to recovery and decoding of a NP I frame. Upon I frame acquisition the output may be switched from "Trick Play" to ATV images.

The compressed TP signal from block 230 is coupled to an inner parity generator 240, which adds Reed Soloman error correcting data to the TP data stream. The TP video data, with RS inner parity added, is coupled to a TP video data sync block formatter 250, which generates only the specific numbered sync blocks required for "Trick Play" reproduction at specific speeds. For example, "Trick Play" reproduction at various speeds is possible with sync blocks allocated as shown in the embodiments of FIGS. 8 or 16. These TP video data sync blocks are output as signal 251 which is coupled to the video and audio sector constructor 340 of SD DVCR 300.

During playback SD recorder 350 reproduces "Trick Play" data signal 353, which coupled to an error correcting processor 259. Following error correction the TP data stream is coupled for signal decompression in processing block 260 of the ATV and "Trick Play" processor 200. The details operation of block 260 will be described with respect to FIG. 20. However, in simple terms, decompressor 260 is utilized to regenerate down converted ATV images from the compressed TP data recovered from the recording medium.

Figure 20:
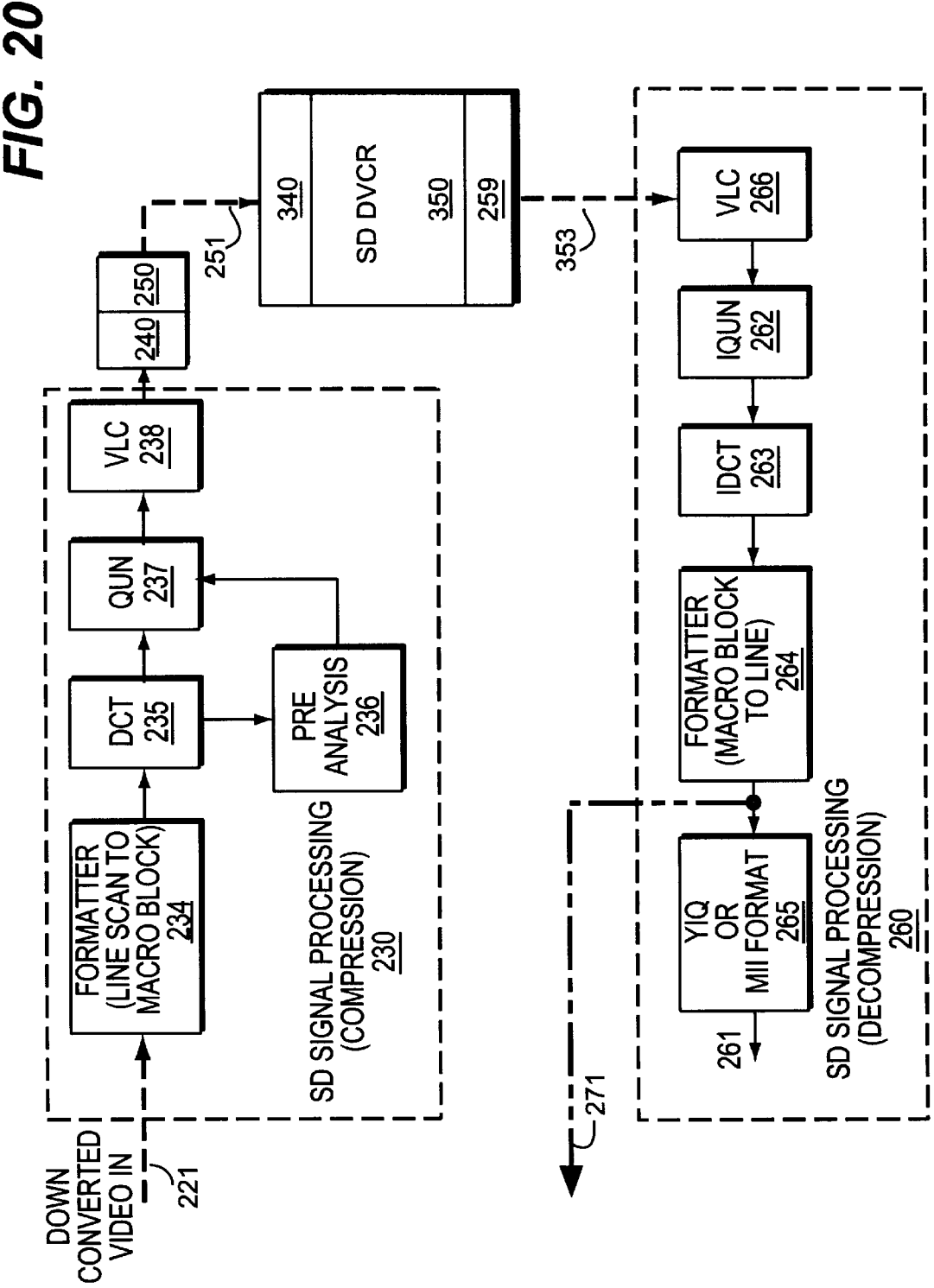
FIG. 20 is a system block diagram of an inventive "Trick Play" encoder and decoder.

An inventive "Trick Play" signal compression processor, for generating data signal 251, is shown in blocks 234–238 of FIG. 20. Replayed TP data may be decompressed by blocks 262–266 of FIG. 20. Rate reduced ATV signal 221, is coupled to formatter 234, which converts the scan line format of signal 221 into a two dimensional macro block or MB, structure comprising 4 DCT blocks. Thus a macro block has the dimensions of 32 pixels by 8 lines. The macro block formatted, rate reduced signal, is coupled to block 235 for discrete cosine transformation. The principals of the discrete cosine transform are well known, with a data rate reduction ensuing from the control of coefficient quantization. DCT block 235, produces two output signals which represent the amplitude value of the frequency coefficients that comprise each macro block. One output signal is coupled to block 236 which pre-analyzes the amplitudes of the coefficients and controls the coarseness or fineness of quantization by quantizer block 237. The second output from DCT block 235 is coupled to quantizer block 237 for quantization, where the number of quantizing steps is dynamically controlled responsive to block 236. The quantized DCT coefficients are coupled to block 238 for variable length encoding. Various methods of variable length coding or VLC are known. However, in simplistic terms, the most frequently occurring quantized coefficient values are assigned correspondingly short code words with less frequent coefficient values being encoded with code words of progressively increasing length. Thus the overall data rate of TP video data is further reduced such that a "Trick Play" frame of data may be recorded in 450 sync blocks provided in 10 recorded tracks.

The variably length coded TP data is coupled to block 240 for generation and addition of a Reed-Soloman inner parity error correction code. The TP data with RS inner parity error correction is coupled to block 250 for formatting to have a specific SD sync block structure, for example, as identified in FIGS. 8 and 16. The TP data having the required sync block structure is coupled to the SD recorder as already described for "Trick Play" processor block 200.

During replay modes, the reproduced TP data stream signal 353, is coupled via error correction in block 259, to decompression block 260 which reverses the signal processing performed by block 230. The VLC TP data signal 353 is input to block 266 which performs variable length decoding. Various methods of decoding are well known, for example, a look up table could be used to convert VLC data words back into quantized DCT coefficients of constant length. From block 266 the TP DCT coefficients are coupled to an inverse quantizer 262, which may be considered to perform digital to analog conversion of the TP DCT coefficients. The TP DCT coefficients are coupled to block 263 which applies an inverse discrete cosine transformation which produces a macro block formatted output signal representing the TP image. The macro block sampled TP signal is reformatted in block 264 to produce a conventional line structured image. The output signal from the reformatter 264 is processed in block 265 which, for example, may provide blanking insertion and sync pulse addition. Signal 261 is output from block 265 and may be coupled for viewing on a component video monitor, or may be encoded for TV viewing. A second output signal 271, from block 264 is coupled to blocks 270 and 280 which provide up conversion from the nominally "NTSC" like line and pixel formats to line rates and horizontal pixel counts required for high definition display viewing.

The up converted TP video signal 131 is coupled as a second input to video processor and sync generator 150, which generates a high definition output signal 151. Video processor and sync generator 150 provides video blanking and the addition of HDTV sync waveforms. However, in addition video processor 150 provides a selecting function for switching between ATV and "Trick Play" video images. FIG. 21 shows, in block diagram form, the replay data paths for ATV data stream 354 and "Trick Play" data stream 353, and their coupling for output selection in video processor and sync generator 150. The selection of output image source is ultimately responsive to user initiated control command communicated via a control system. For example, a Play command will start the VCR mechanism and switch the electronic system from an EE mode, (electronics to electronics) to a replay condition. However, the actual instant of output signal switching may be determined by various other controlling factors. For example, the most significant controlling event may be the acquisition and decoding of an I frame from a recorded GOP. This occurrence may be signaled by decoder 130 and coupled to control the video output selector switch within the video processor and sync generator 150.

As described earlier, a 15 frame GOP will occupy 150 recorded tracks, thus when initiating play mode, a replayed video image may be delayed until an I frame has been reproduced and decoded, i.e. up to 140 tracks may need to be reproduced until an I frame is encountered. However, since TP data is advantageously recorded within each frame of a GOP, and is reproduced in a normal play mode, TP data may be utilized to generate an output video signal without waiting for an I frame occurrence. Thus the redundant nature of TP data recording may advantageously provide images for normal speed replay, derived from TP data, at the initiation of normal playback, with ATV images being selected when available, following I frame acquisition.

When a user initiates a command starting or terminating a "Trick Play" mode, the control system, and in particular the video processor and sync generator 150, may be advantageously controlled to present the user with a more aesthetically pleasing image transition. For example, as already described, at the initiation of normal speed playback "Trick Play" images may be output, prior to the acquisition and decoding of an I frame. A further use of TP video data may be during the transition to a "Trick Play" reproducing speed, where TP video data which was recovered and stored during normal playback may used together with TP data transduced during a replay speed transition. Such a use of TP data provides an alternative to sustaining the last ATV frame until TP video data is available at the selected TP speed.

When transitioning from a "Trick Play" mode to normal play, the ATV signal 131 will become available for display processing only after the occurrence an I frame in the replayed ATV signal GOP. This I frame occurrence depends on the resynchronization rate of the SD recorder capstan servo, and more significantly, where in the recorded GOP sequence normal play speed was re-acquired. Thus various options may be advantageously provided to produce a pleasing image transition between "Trick Play" and normal playback. For example, upon the command terminating "Trick Play" the last TP frame may be frozen and repeated from a memory until ATV signals are reproduced. This method may indicate to the user that the control command has been received and executed. However, a frozen or still image juxtaposed with the fast moving images produced in TP, may appear incongruous to the user. A further option for transition from "Trick Play" may be provided by continuing to reproduce TP data and display TP images for the duration of servo resynchronization and ATV signal I frame acquisition. With this option, the redundant nature of the TP data may be exploited during the tape speed change, resulting from the servo resynchronization, and during the wait for an ATV I frame. During the tape speed change, despite the redundant nature of the TP data, some TP data may not be recovered, however such errors may be concealed by TP image frames repeated from a memory. This advantageous method provides the user with a visual indication that the VCR is responding to the command since the speed of the TP image will visibly change as the capstan slows to re-synchronize at play speed. This feature may also permit slower tape speed transitions to be used thus providing smoother and less potentially damaging tape handling since tape acceleration or deceleration will be accompanied by accelerating or decelerating "Trick Play" images.

I claim:

1. A digital video recorder for reproducing a digital image signal at a plurality of reproducing speeds, said recorder comprising:
   a transducer for recovering a digital signal from a recorded medium, said digital signal having a first data signal representing said digital image signal and a second data signal representing a form of said digital image signal processed for trick play reproduction;
   means coupled to said transducer for separating said digital signal into said first and said second data signals;
   means responsive to a selection of one of a plurality of reproducing speeds and at least one of said first and second data signals for generating an image source control signal; and,
   selecting means coupled to said separating means and responsive to said control signal for selecting between said first and second data signals for coupling to form output image sources;
   wherein during a transition from a non-reproducing mode to a normal play speed reproducing mode, said second data signal is selected for coupling to form an output image source until normal play speed is achieved whereupon said first data signal is selected for coupling to form an output image source.

2. The digital video recorder of claim 1, wherein said plurality reproducing speeds represent a first speed equal to a normal play speed and a second speed different from said normal play speed.

3. The digital video recorder of claim 2, wherein said first data signal is selected as an output image source for reproduction at said first speed.

4. The digital video recorder of claim 2, wherein said second data signal is selected as an output image source for reproduction at said second speed.

5. The digital video recorder of claim 2, wherein during operation at said first speed said second speed is selected and said selecting means immediately selects said second data signal as an output image source.

6. The digital video recorder of claim 2, wherein said second data signal is selected during a transition from operation at said second speed to operation at said first speed and upon assumption of said first speed said first data signal is selected.

7. The digital video recorder of claim 2, wherein a transition from a non-reproducing mode to said first speed said control signal controls said selecting means to select said second data signal for forming a still image and selecting said first data signal upon assumption of said first speed.

8. The digital video recorder of claim 1, wherein said digital image signals have an MPEG compatible format.

9. The digital video recorder of claim 1, wherein said plurality reproducing speeds represent a first speed equal to a normal play speed and a second speed equal to a normal play speed in a reverse direction to said first speed.

10. The digital video recorder of claim 9, wherein said second data signal is selected as an output image source for reproduction at said second speed in said reverse direction.

11. The digital video recorder of claim 1, wherein said processed form of said digital image signals represents said digital image having reduced resolution.

12. A digital video recorder for reproducing a digital image signal, said recorder comprising:
    a play back transducer for transducing a digital signal from a recorded medium, said digital signal having first and second data signals, having a compatible MPEG format and said first data signal representing image data for reproduction at normal play speed and said second data signal representing image data for reproduction at a speed greater than normal play speeds;
    means coupled to said transducer for separating said digital signal into said first and said second data signals;
    selecting means coupled to said separating means for selecting one of said first and said second data signals; and,
    decoding means coupled to receive said one of said first and said second data signals for decoding to form a signal for display,
    wherein upon initiation of reproduction said selecting means selects said second data signal for coupling to said decoder, and responsive to said separating means detecting an I frame signal occurrence in said first data signal, said selecting means selects said first data signal for coupling to said decoder.

13. The digital video recorder of claim 12, wherein a transition from reproduction at a speed greater than normal play speed to reproduction reproduction at normal play speed said second data signal is coupled for decoding and responsive to an I frame signal occurrence in said first data signal said selecting means selects said first data signal for coupling to said decoder.

* * * * *